(12) United States Patent
Yoshinari et al.

(10) Patent No.: US 11,511,387 B2
(45) Date of Patent: Nov. 29, 2022

(54) ELECTRIC TOOL

(71) Applicant: Koki Holdings Co., Ltd., Tokyo (JP)

(72) Inventors: Takuya Yoshinari, Ibaraki (JP); Kazutaka Iwata, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 824 days.

(21) Appl. No.: 16/463,383

(22) PCT Filed: Oct. 27, 2017

(86) PCT No.: PCT/JP2017/038898
§ 371 (c)(1),
(2) Date: May 23, 2019

(87) PCT Pub. No.: WO2018/100942
PCT Pub. Date: Jun. 7, 2018

(65) Prior Publication Data
US 2020/0130127 A1 Apr. 30, 2020

(30) Foreign Application Priority Data

Nov. 30, 2016 (JP) .............................. JP2016-232948

(51) Int. Cl.
*B24B 23/02* (2006.01)
*H02P 6/17* (2016.01)
(Continued)

(52) U.S. Cl.
CPC ................ *B24B 23/02* (2013.01); *B25F 5/00* (2013.01); *H02P 3/22* (2013.01); *H02P 6/17* (2016.02); *H02P 6/24* (2013.01); *H02P 27/08* (2013.01)

(58) Field of Classification Search
CPC .... H02P 27/08; H02P 6/17; H02P 3/18; B25F 5/00; B24B 23/028
See application file for complete search history.

(56) References Cited

U.S. PATENT DOCUMENTS 9,007,011 B2 * 4/2015 Aoki ........................ H02P 3/22
318/703
2014/0352995 A1 * 12/2014 Matsunaga ............. H02P 7/245
173/179

FOREIGN PATENT DOCUMENTS

JP 2007275999 10/2007
JP 2011005588 A * 1/2011
(Continued)

OTHER PUBLICATIONS

"International Search Report (Form PCT/ISA/210) of PCT/JP2017/038898," dated Jan. 23, 2018, with English translation thereof, pp. 1-3.
(Continued)

Primary Examiner — Said Bouziane
(74) Attorney, Agent, or Firm — JCIPRNET

(57) ABSTRACT

An electric tool capable of achieving inhibition of reaction due to braking in good balance with inhibition of voltage jumping due to regenerated energy is provided. A grinder (1) is provided with a motor (6), an inverter circuit (43) for supplying electric current to the motor (6), and a controller (50) for controlling the inverter circuit (43). When generating an electric braking force on a motor (6), the rotation speed of which exceeds a specified rotation speed, the controller (50) performs a first braking control of continuously turning on lower arm-side switching elements (Q4-Q6) of the inverter circuit (43), after which the controller performs a second braking control of repeatedly turning on and off the lower arm-side switching elements (Q4-Q6).

12 Claims, 4 Drawing Sheets

(51) Int. Cl.
*B25F 5/00* (2006.01)
*H02P 3/22* (2006.01)
*H02P 6/24* (2006.01)
*H02P 27/08* (2006.01)

(56) References Cited

FOREIGN PATENT DOCUMENTS

| | | |
|---|---|---|
| JP | 2012162274 | 8/2012 |
| JP | 2012196143 | 10/2012 |
| JP | 2012205362 | 10/2012 |
| JP | 2015211502 | 11/2015 |
| WO | 2016084553 | 6/2016 |
| WO | 2016098563 | 6/2016 |

OTHER PUBLICATIONS

"Office Action of Japan Counterpart Application," with English translation thereof, dated Nov. 26, 2019, p. 1-p. 8.

* cited by examiner

ELECTRIC TOOL

CROSS-REFERENCE TO RELATED APPLICATION

This application is a 371 application of the International PCT application serial no. PCT/JP2017/038898, filed on Oct. 27, 2017, which claims the priority benefits of Japan Patent Application No. 2016-232948, filed on Nov. 30, 2016. The entirety of each of the above-mentioned patent applications is hereby incorporated by reference herein and made a part of this specification.

BACKGROUND

Technical Field

The disclosure relates to an electric tool such as a grinder that has a braking function.

Description of Related Art

Conventionally, there are electric tools such as grinders that automatically brake (apply braking) when the operation switch such as a trigger is turned off. If the drive source is a brushless motor, the electric braking force can be generated by turning on the lower arm-side switching elements of the inverter circuit that supplies an electric current to the brushless motor, for example.

RELATED ART

Patent Document

[Patent Document 1] Japanese Laid-open No. 2007-275999

SUMMARY

Problems to be Solved

In the case of a braking control that continuously turns on the lower arm-side switching elements, the reaction increases and the wheel nut that fixes the rotation tool to the spindle may tend to loosen. Here, if the lower arm-side switching elements are turned on and off by PWM (pulse width modulation) control, for example, the reaction can be reduced and the loosening of the wheel nut can be suppressed. However, in the case of PWM control, there is a problem that the voltage jumps up due to regenerated energy and the risk of exceeding the withstand voltage of the element increases.

In view of the above situation, the disclosure provides an electric tool that can inhibit reaction due to braking and inhibit voltage jumping due to regenerated energy in good balance.

Means for Solving the Problems

An embodiment of the disclosure is an electric tool. The electric tool includes: a motor; an inverter circuit supplying an electric current to the motor; and a controller controlling the inverter circuit, wherein when generating an electric braking force on the motor, the controller performs a first braking control of continuously turning on a predetermined switching element of the inverter circuit and then performs a second braking control of repeatedly turning on and off the predetermined switching element.

The controller may switch from the first braking control to the second braking control when a rotation speed of the motor becomes equal to or less than a predetermined rotation speed in braking control.

A rotation tool driven by the motor may be provided, and the controller may set the predetermined rotation speed according to an inertia moment of the rotation tool.

The controller may determine the inertia moment of the rotation tool based on a time change rate of the rotation speed during acceleration or deceleration of the motor or a starting current of the motor.

The controller may turn on at least one of upper arm-side switching elements or at least one of lower arm-side switching elements of the inverter circuit in the first braking control.

The controller may set a duty ratio of an on period of the predetermined switching element constant in the second braking control.

The controller may set a duty ratio of an on period of the predetermined switching element variable in the second braking control.

The controller may gradually increase the duty ratio in the second braking control.

A capacitor may be provided on an input side of the inverter circuit, and the controller may perform the second braking control so that a voltage applied to the capacitor by regenerated energy does not exceed a withstand voltage of the capacitor.

Another embodiment of the disclosure is an electric tool. The electric tool includes: a motor; an inverter circuit supplying an electric current to the motor; a capacitor provided on an input side of the inverter circuit; and a controller controlling the inverter circuit, wherein when generating an electric braking force on the motor, the controller performs a braking control so that a voltage applied to the capacitor by regenerated energy does not exceed a withstand voltage of the capacitor.

The controller may perform a first braking control of continuously turning on a predetermined switching element of the inverter circuit and then perform a second braking control of repeatedly turning on and off the predetermined switching element.

An operation switch switching between driving and stopping the motor may be provided, and the controller may generate the electric braking force on the motor when the operation switch enters a state of instructing the motor to stop.

The electric tool may operate with AC power supplied from outside.

Any combination of the above components obtained by converting the representation of the disclosure between methods, systems or the like is also effective as an embodiment of the disclosure.

Effects

According to the disclosure, it is possible to provide an electric tool that can inhibit reaction due to braking and inhibit voltage jumping due to regenerated energy in good balance.

BRIEF DESCRIPTION OF THE DRAWINGS

FIG. 2 is a side cross-sectional view of the grinder 1 with the operation switch 5 turned on.

DESCRIPTION OF THE EMBODIMENTS

Figure 1:
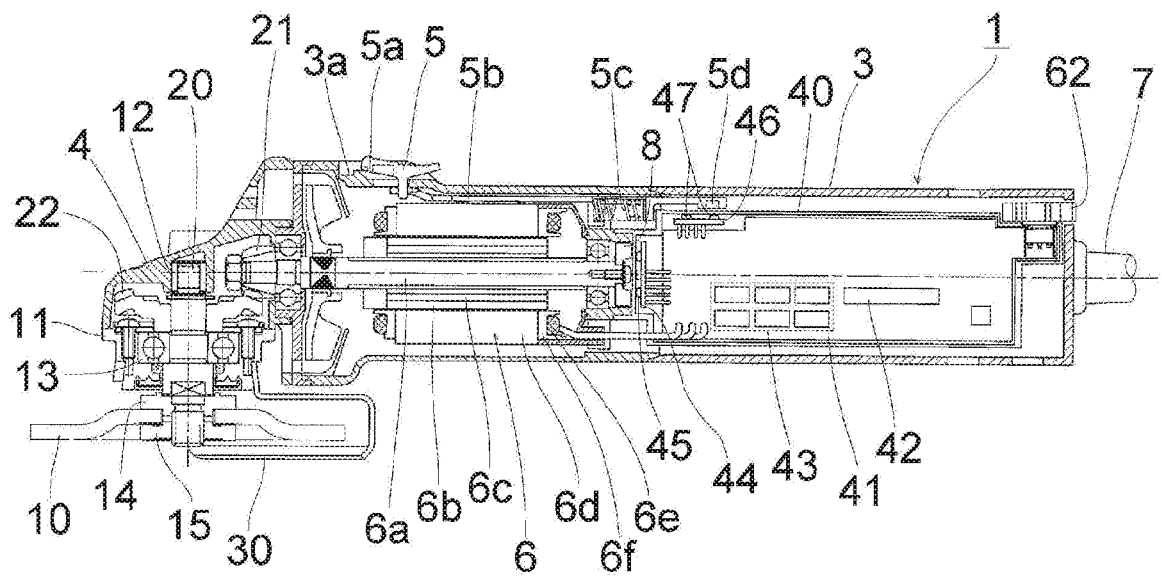
FIG. 1 is a side cross-sectional view of the grinder 1 according to an embodiment of the disclosure, with the operation switch 5 turned off.

Hereinafter, preferred embodiments of the disclosure will be described in detail with reference to the drawings. The same or equivalent components, members, processes or the like shown in the drawings are denoted by the same reference numerals, and redundant description will be omitted as appropriate. In addition, the embodiments are not intended to limit the disclosure and are merely examples, and all the features and combinations thereof described in the embodiments are not necessarily essential to the disclosure.

Figure 2:
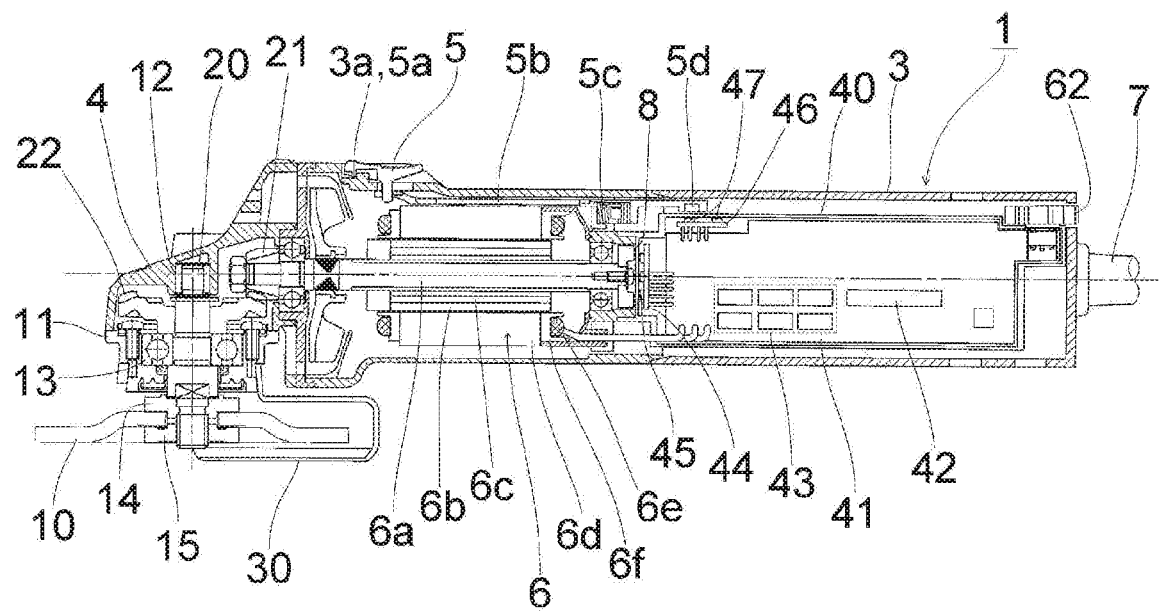

FIG. 1 is a side cross-sectional view of a grinder 1 according to the first embodiment of the disclosure, with an operation switch 5 turned off. FIG. 2 is a side cross-sectional view of the grinder 1 with the operation switch 5 turned on. As shown in FIG. 1, the grinder 1 includes, for example, a disc-shaped rotation tool (tip tool) 10 such as a grindstone, and is used in a grinding operation or the like for flattening the surface of concrete or stone. In addition to a disc-shaped grinding grindstone or cutting grindstone, a disc-shaped brush, cutter or the like may be attached as the rotation tool 10. The grinder 1 includes a housing 3 (made of resin, for example) and a gear case 4.

The housing 3 has a substantially cylindrical shape as a whole, and a motor (electric motor) 6 serving as the prime mover is housed inside the housing 3. The motor 6 is connected to an external AC power supply such as a commercial power supply via a power cord 7 drawn from the rear end of the housing 3. A first bevel gear 21 is provided at the front end portion of an output shaft 6a of the motor 6. The housing 3 is provided with the operation switch (trigger switch) 5 that switches between powering and not powering the motor 6 (drive and stop of the motor 6). The operation switch 5 is urged rearward (the direction of turning off) by a spring 5c, but the operation switch 5 can be slid forward to hook a locking protrusion 5a onto a locking recess 3a of the housing 3, as shown in FIG. 2, so as to lock the operation switch 5 in the on state.

The gear case 4 is made of metal such as aluminum alloy, for example, and is attached to the front end portion of the housing 3. An opening of the gear case 4 is closed by a packing gland 11 that serves as a lid member. The packing gland 11 is fixed to the gear case 4 by screwing, for example. The packing gland 11 serves as a holding member for holding a wheel guard 30 which will be described later. Two bearings (a needle bearing 12 and a ball bearing 13) are provided inside the gear case 4, and a spindle 20 is rotatably held by the bearings. The spindle 20 is substantially orthogonal to the output shaft 6a (rotor rotation shaft) of the motor 6, and one end of the spindle 20 penetrates the packing gland 11 to protrude to the outside. Further, a second bevel gear 22 that meshes with the first bevel gear 21 attached to the output shaft 6a of the motor 6 is provided (attached) at the other end of the spindle 20 positioned in the gear case 4. The rotation of the motor 6 is converted by 90 degrees in the rotational direction by the first bevel gear 21 and the second bevel gear 22 that serve as a deceleration part, and the rotational speed is reduced and transmitted to the spindle 20. That is, the spindle 20 is rotationally driven by the motor 6.

The rotation tool 10 is fixed to the spindle 20 by a wheel washer 14 and a wheel nut (lock nut) 15, and rotates integrally with the spindle 20. When the operation switch 5 provided on the housing 3 is operated, power is supplied to the motor 6 and the output shaft 6a of the motor 6 rotates. Then, the spindle 20 connected to the output shaft 6a via the first bevel gear 21 and the second bevel gear 22 rotates, and the rotation tool 10 fixed to the spindle 20 rotates. The wheel guard 30 is attached to the packing gland 11 so as to cover at least ½ or more of the outer circumference of the rotation tool 10. The wheel guard 30 is restrained from rotating so that its rotational position does not change during operation, and the rotational position can be changed according to the work content by releasing the wheel guard 30 from the restraint.

The motor 6 is an inner rotor type brushless motor in the present embodiment, and a rotor core 6b composed of a magnetic substance to rotate integrally with the output shaft 6a is provided around the output shaft 6a. A plurality of (four, for example) rotor magnets (permanent magnets) 6c are inserted and held in the rotor core 6b. A stator core 6d is provided (fixed to the housing 3) around the rotor core 6b. A stator coil 6e is provided on the stator core 6d via an insulator 6f. The housing 3 that holds the stator core 6d is used as the handle of the grinder 1.

In the housing 3, a controller box 40 is provided behind the motor 6. The controller box 40 houses a main board 41, a sensor board 44, and a switch board 46. The main board 41 is provided with a diode bridge 42, an inverter circuit 43, and a controller 50 shown in FIG. 3. The sensor board 44 faces a sensor magnet 8 provided at the rear end portion of the output shaft 6a of the motor 6. Three Hall ICs (magnetic sensors) 45 that serve as the rotational position detecting means are provided, for example, at an interval of 60° on the surface of the sensor board 44 that faces the sensor magnet 8. By detecting the magnetic field generated by the sensor magnet 8 with the Hall ICs 45, the rotational position (rotor rotational position) of the motor 6 can be detected. The switch board 46 faces a switch magnet 5d provided at the tip portion of a slide bar 5b that slides in conjunction with the operation of the operation switch 5. Two Hall ICs (magnetic sensors) 47 are provided on the surface of the switch board 46 that faces the switch magnet 5d. The switch magnet 5d faces either of the Hall ICs 47 in response to on/off of the operation switch 5.

A speed-setting dial 62 is provided (held) at the rear end portion of the housing 3 to serve as a speed-setting means to be operated by an operator (user). The speed-setting dial 62 is a dial type variable resistor, and the resistance value of the variable resistor is changed by turning the speed-setting dial 62. A speed-setting signal indicating a value (voltage) according to the turning amount (operation state) of the speed-setting dial 62 set by the operator is inputted to the controller 50 shown in FIG. 3. The controller 50 sets the rotational speed of the motor 6 according to the value of the inputted speed-setting signal, that is, the operation state of the speed-setting dial 62, and controls the driving of the motor 6. The operator can set (adjust) the rotational speed of the motor 6 (rotational speed of the rotation tool 10) to a desired speed by operating the speed-setting dial 62. The controller 50 changes the rotational speed of the motor 6 continuously in accordance with the operation state of the speed-setting dial 62.

Figure 3:
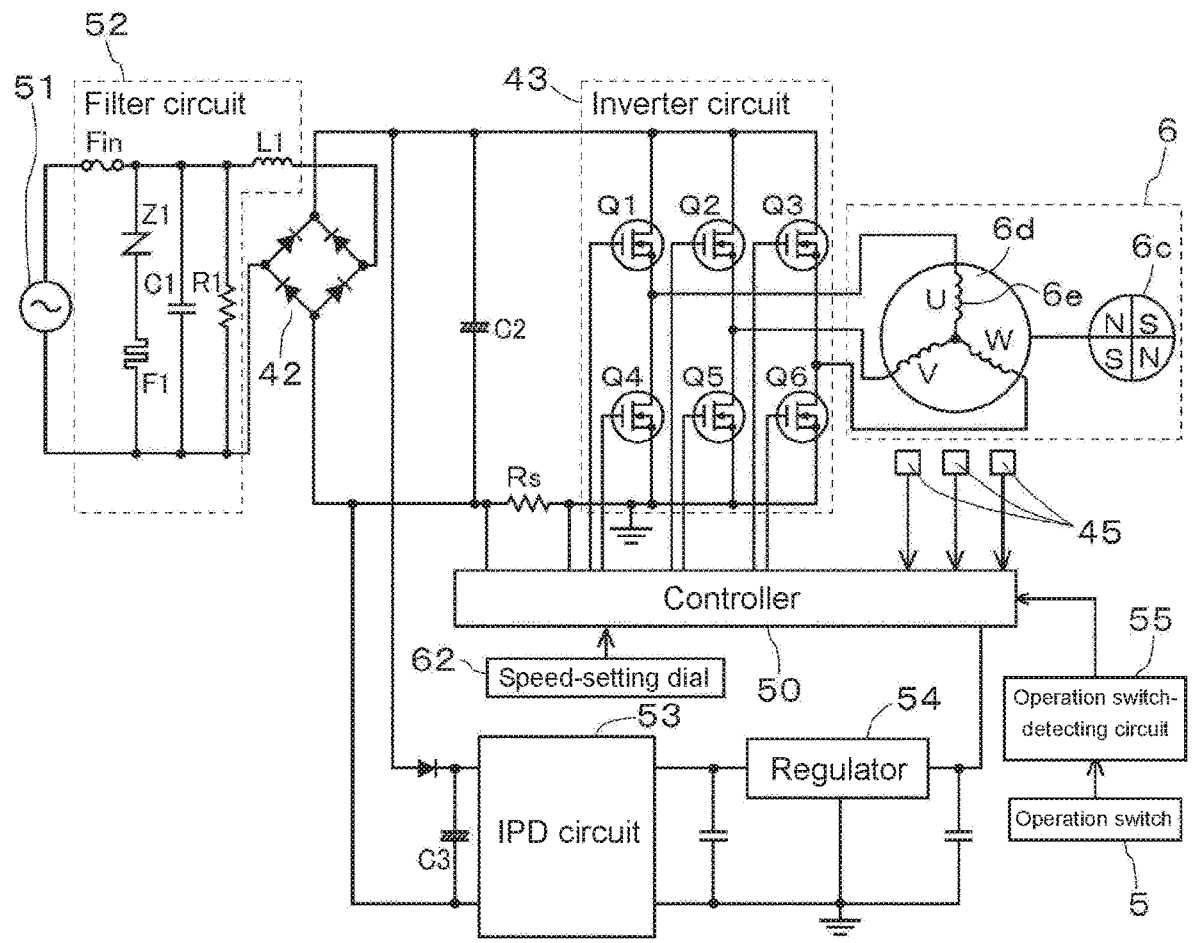
FIG. 3 is a control block diagram of the grinder 1.

FIG. 3 is a control block diagram of the grinder 1. The diode bridge 42 is connected to an AC power supply 51 via a filter circuit 52 that deals with noise. The filter circuit 52 includes a fuse Fin, a varistor Z1, a pattern fuse F1, a capacitor C1, a resistor R1, and a chock coil L1. The fuse Fin is for protection when the switching elements Q1 to Q6 are short-circuited. The varistor Z1 is for surge voltage absorption. The pattern fuse F1 plays a role of preventing short-circuiting between lines when the varistor Z1 works. The capacitor C1 and the chock coil L1 are for removing noise between the lines. The resistor R1 is a discharge resistor of the capacitor C1. The diode bridge 42 that serves as a rectifier circuit full-wave rectifies the output voltage from the filter circuit 52 and converts it into a direct current. An electrolytic capacitor C2 is for surge absorption and is provided between the output terminals of the diode bridge 42.

The inverter circuit 43 includes the switching elements Q1 to Q6 such as IGBTs and FETs connected in a three-phase bridge, and switches the voltage rectified and smoothed by the diode bridge 42 and the electrolytic capacitor C2 according to the control of the controller 50 and supplies a driving current to the stator coil 6e (each winding of U, V, and W) of the motor 6. A resistor Rs is provided in the current path of the motor 6. The controller 50 detects the current of the motor 6 by the voltage between two terminals of the resistor Rs. Further, the controller 50 detects the rotational position (rotor rotational position) of the motor 6 based on the output voltages of the Hall ICs 45.

The IPD (intelligent power device) circuit 53 is a circuit composed of an IPD element which is an intelligent power device, a capacitor, etc., and is a DC-DC switching power supply circuit that reduces the voltage rectified and smoothed by the diode bridge 42 and the electrolytic capacitor C2 to about 18V, for example. The IPD circuit 53 is an integrated circuit and has an advantage of low power consumption and energy saving. The output voltage of the IPD circuit 53 is further reduced to about 5V, for example, by the regulator 54 and supplied to the controller 50 as an operating voltage (power supply voltage Vcc). The controller 50 is, for example, a microcontroller (microcomputer).

An operation switch-detecting circuit 55 is two Hall ICs 47 mounted on the switch board 46 of FIG. 1 and transmits a switch operation detection signal corresponding to the position (on/off) of the operation switch 5 to the controller 50. The controller 50 performs switching control (PWM control, for example) on the switching elements Q1 to Q6 based on the switch operation detection signal (the position of the operation switch 5) and the speed-setting signal according to the turning amount of the speed-setting dial 62, and drives the motor 6. When detecting that the operation switch 5 is turned off based on the switch operation detection signal, the controller 50 performs a braking control of generating an electric braking force on the motor 6. The braking control of the present embodiment will be described below.

When the operation switch 5 is turned off, first, the controller 50 performs a first braking control of continuously turning on at least one of the lower arm-side switching elements Q4 to Q6 while keeping the upper arm-side switching elements Q1 to Q3 of the inverter circuit 43 off, and then performs a second braking control of turning on and off at least one of the lower arm-side switching elements Q4 to Q6 by PWM control, for example, while keeping the upper arm-side switching elements Q1 to Q3 off. The first braking control may be a braking control of continuously turning on at least one of the upper arm-side switching elements Q1 to Q3 while keeping the lower arm-side switching elements Q4 to Q6 off. Similarly, the second braking control may be a braking control of turning on and off at least one of the upper arm-side switching elements Q1 to Q3 by PWM control, for example, while keeping the lower arm-side switching elements Q4 to Q6 off. The number of the lower arm-side switching elements or the upper arm-side switching elements that are turned on in the first and second braking controls may be one, two, or three (all). In the following description, the switching elements turned on in the first and second braking controls are the three lower arm-side switching elements Q4 to Q6.

The controller 50 switches from the first braking control to the second braking control, for example, at a timing when the rotation speed R of the motor 6 becomes equal to or less than a predetermined rotation speed Rth. The controller 50 may set the predetermined rotation speed Rth according to the inertia moment of the rotation tool 10. In this case, the controller 50 sets the predetermined rotation speed Rth to be lower as the inertia moment of the rotation tool 10 increases (the predetermined rotation speed Rth at the time when the inertia moment is large is set lower than the predetermined rotation speed Rth at the time when the inertia moment is small). The controller 50 can determine the inertia moment of the rotation tool 10 based on the time change rate of the rotation speed during acceleration or deceleration of the motor 6 or the starting current of the motor 6. The controller 50 may set the duty ratio of the on period of the lower arm-side switching elements Q4 to Q6 constant or variable in the second braking control. In the case of a variable duty ratio, it is preferable to gradually increase the duty ratio so that the motor 6 can be completely stopped quickly and with high accuracy. The controller 50 performs the second braking control so that the voltage applied to the electrolytic capacitor C2 by the regenerated energy does not exceed the withstand voltage of the electrolytic capacitor C2.

The background of the braking control that combines the first and second braking controls is as follows. That is, when only the first braking control is performed throughout the entire deceleration period, the reaction increases and the wheel nut 15 that fixes the rotation tool 10 to the spindle 20 tends to loosen. On the other hand, when only the second braking control is performed throughout the entire deceleration period, the reaction can be reduced to suppress loosening of the wheel nut 15, but the voltage jumps up to about 700V, for example, due to the regenerated energy, and the risk of exceeding the withstand voltage of the element such as the electrolytic capacitor C2 increases. Here, if an element having a high withstand voltage is adopted in order to withstand the voltage jumping, it is necessary to set the capacitance of the electrolytic capacitor C2 to 5F, for example, and it will increase the element size and the cost. Particularly for the grinder 1 that operates with AC power supplied from the outside, it is important to deal with the problem of voltage jumping because the regenerated energy cannot escape to the battery pack. Therefore, in the present embodiment, by combining the first and second braking controls as described above, it is possible to inhibit reaction due to braking and inhibit voltage jumping due to regenerated energy in good balance. Specifically, the regenerated energy is consumed (reduced to a certain level or less) by the first braking control in which the voltage jumping that is caused by the regenerated energy does not occur due to not performing the switching, and then the second braking control is performed by PWM control, so as to reduce reaction and suppress loosening of the wheel nut 15.

Figure 4:
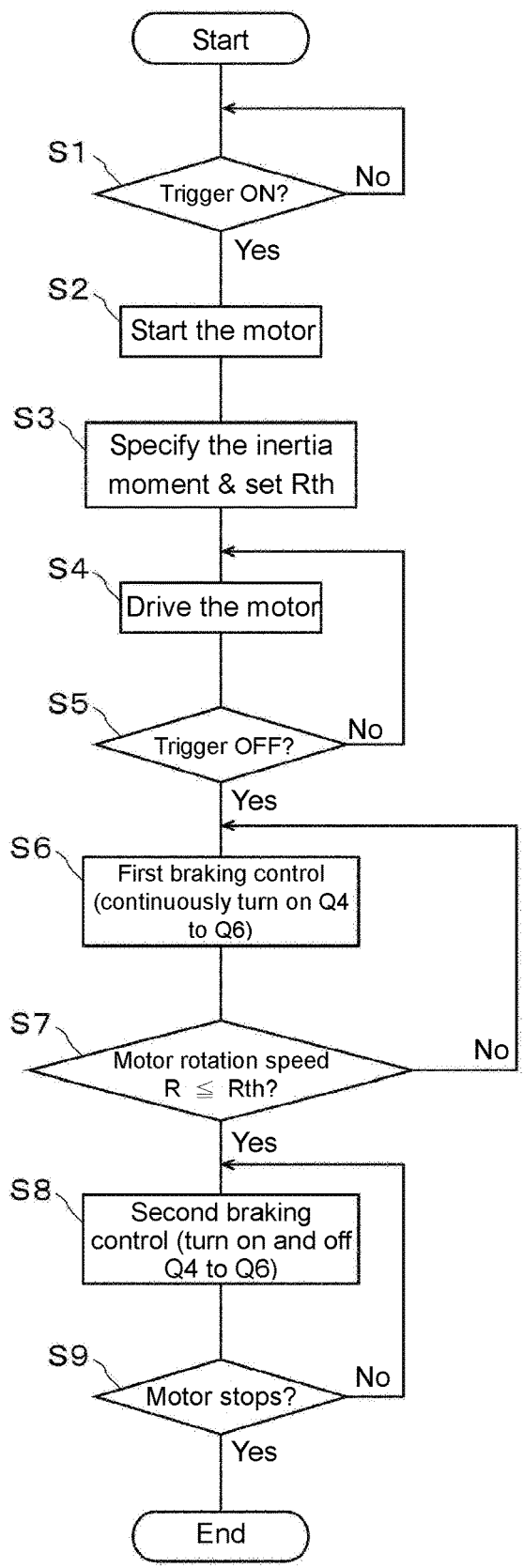
FIG. 4 is a control flow chart of the grinder 1.

FIG. 4 is a control flow chart of the grinder 1. When the operation switch 5 is turned on (Yes in S1), the controller 50 starts the motor 6 (S2). The controller 50 specifies the inertia moment of the rotation tool 10 based on the starting current of the motor 6 and sets the predetermined rotation speed Rth (S3). Thereafter, the controller 50 drives the motor 6 at the rotational speed set by the speed-setting dial 62 (S4). When the operation switch 5 is turned off (Yes in S5), the controller 50 performs the first braking control (S6). That is, the controller 50 performs the braking control of continuously turning on the lower arm-side switching elements Q4 to Q6 while the upper arm-side switching elements Q1 to Q3 are turned off. The controller 50 continues the first braking control while the rotation speed R of the motor 6 exceeds the predetermined rotation speed Rth (No in S7→S6). The controller 50 performs the second braking control (S8) when the rotation speed R of the motor 6 becomes equal to or less than the predetermined rotation speed Rth (Yes in S7). That is, the controller 50 performs the braking control of repeatedly turning on and off the lower arm-side switching elements Q4 to Q6 while the upper arm-side switching elements Q1 to Q3 are turned off (the braking control by PWM control of the switching elements Q4 to Q6). The controller 50 continues the second braking control until the motor 6 stops (No in S9→S8). In the flow chart of FIG. 4, in Step S3, the inertia moment of the rotation tool 10 is specified by the starting current of the motor 6, but the inertia moment of the rotation tool 10 may be specified by the time change rate of the rotation speed during acceleration due to the start of the motor 6. The inertia moment of the rotation tool 10 may also be specified by the time change rate of the rotation speed during deceleration due to turning off of the operation switch 5, and in this case, a period for naturally decelerating the motor 6 without performing braking control may be provided between Step S5 and Step S6, and the inertia moment of the rotation tool 10 may be specified by the time change rate of the rotation speed during this period.

Figure 5:
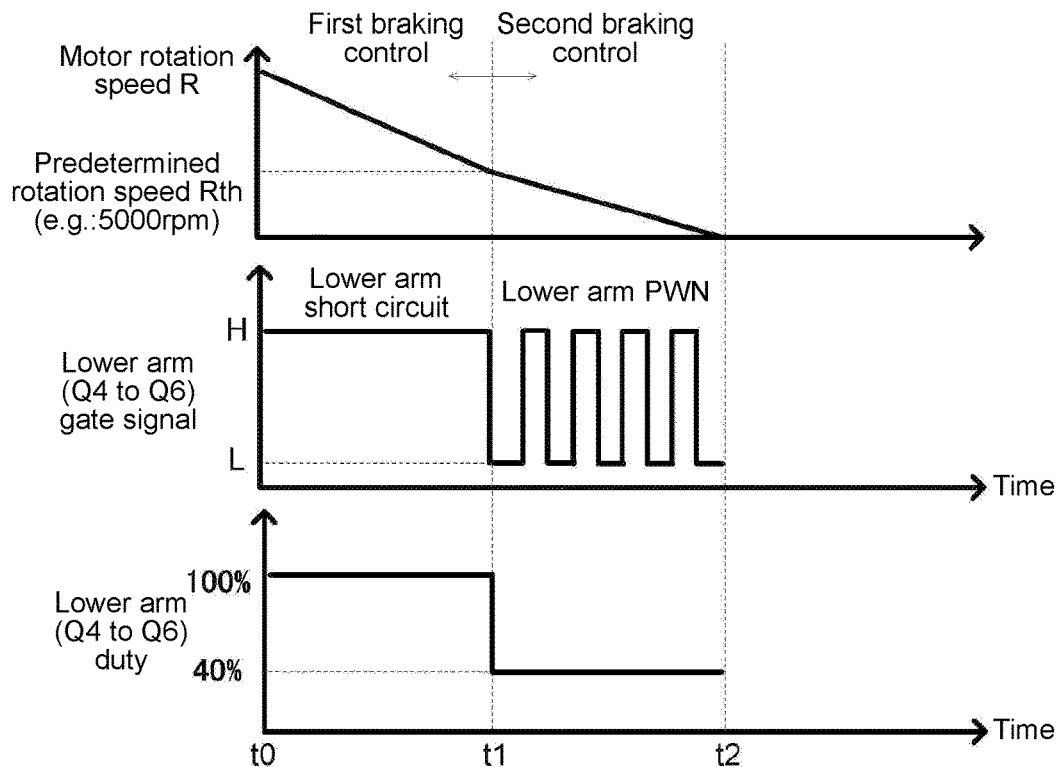
FIG. 5 is a time chart of the deceleration period of the grinder 1 when the duty ratio of the PWM control of the switching elements Q4 to Q6 is set constant in the second braking control.

FIG. 5 is a time chart of the deceleration period of the grinder 1 when the duty ratio of the PWM control of the switching elements Q4 to Q6 is set constant in the second braking control. The on/off of the gate signals of the lower arm-side switching elements Q4 to Q6 after the time t1 in FIG. 5 conceptually indicates a fixed duty ratio, and indicates the on/off in a cycle much longer than the actual on/off cycle. When the operation switch 5 is turned off at the time t0, the controller 50 performs the first braking control of continuously turning on the lower arm-side switching elements Q4 to Q6 (turn on at a duty ratio of 100%). When the rotation speed R of the motor 6 becomes equal to or less than the predetermined rotation speed Rth (5000 rpm, for example) at the time t1, the controller 50 performs the second braking control of repeatedly turning on and off the lower arm-side switching elements Q4 to Q6 by PWM control. In the example of FIG. 5, the duty ratio during the on period of the lower arm-side switching elements Q4 to Q6 in the second braking control is set constant at 40%. The duty ratio that is set constant is not limited to 40% and can be set as desired. Thereafter, when the motor 6 stops at the time t2, the controller 50 stops the braking control.

Figure 6:
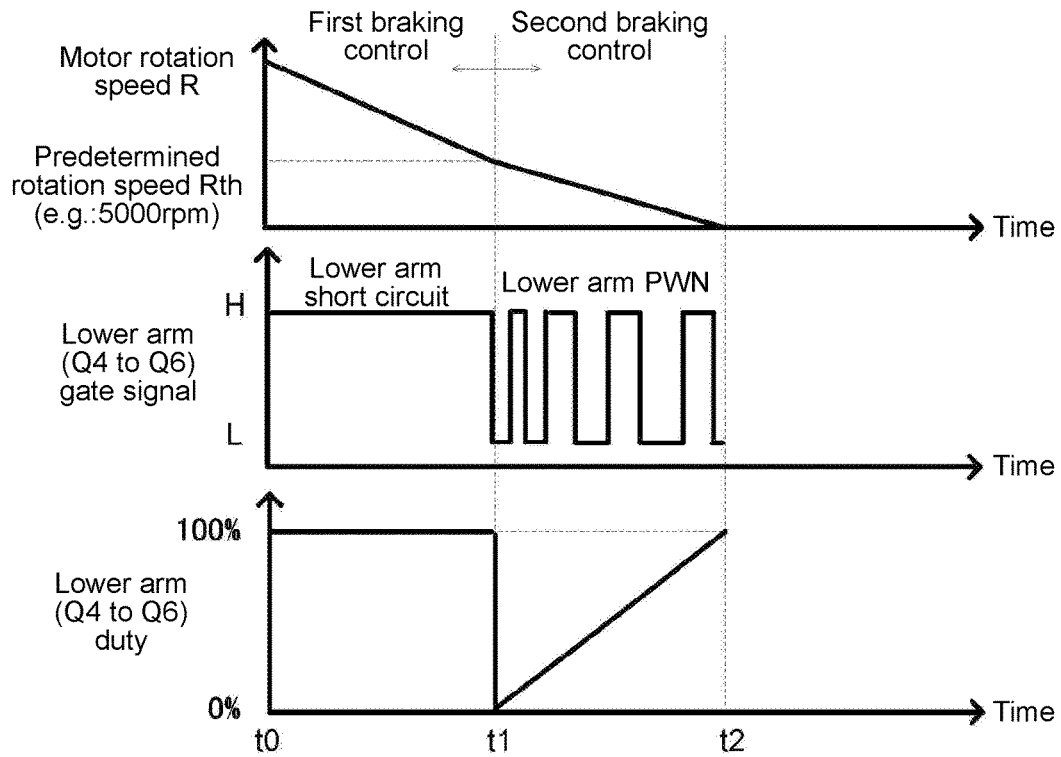
FIG. 6 is a time chart of the deceleration period of the grinder 1 when the duty ratio of the PWM control of the switching elements Q4 to Q6 is set variable in the second braking control.

FIG. 6 is a time chart of the deceleration period of the grinder 1 when the duty ratio of the PWM control of the switching elements Q4 to Q6 is set variable in the second braking control. The on/off of the gate signals of the lower arm-side switching elements Q4 to Q6 after the time t1 in FIG. 6 conceptually indicates a gradually increasing duty ratio, and indicates the on/off in a cycle much longer than the actual on/off cycle. When compared with FIG. 5, the time chart of FIG. 6 is the same as FIG. 5 except that the duty ratio of the on period of the lower arm-side switching elements Q4 to Q6 is gradually increased in the second braking control in the period from the time t1 to the time t2. In the example of FIG. 6, the duty ratio of the on period of the lower arm-side switching elements Q4 to Q6 in the second braking control is continuously increased from 0% to 100%. The duty ratio is not necessarily increased continuously and may be increased stepwise. The initial duty ratio of the second braking control is not limited to 0% and can be set as desired. In addition, the duty ratio at the end of the second braking control is not limited to 100% and can be set as desired.

According to the present embodiment, the following effects can be achieved.

(1) After the regenerated energy is consumed by the first braking control that continuously turns on the lower arm-side switching elements Q4 to Q6, the second braking control that performs PWM control on the lower arm-side switching elements Q4 to Q6 is performed, so as to reduce reaction due to braking to suppress loosening of the wheel nut 15, and to inhibit voltage jumping due to the regenerated energy in good balance. As a result, for example, the electrolytic capacitor C2 can be as small as a capacitor with a withstand voltage of 250V and a capacitance of 180 µF.

(2) Since the controller 50 sets the predetermined rotation speed Rth according to the inertia moment of the rotation tool 10, the controller 50 can perform the optimum braking control according to the type of the rotation tool 10 or the like.

(3) Since the controller 50 determines the inertia moment based on the change rate of the rotation speed during acceleration or deceleration of the electric motor 6, the configuration of usual rotation speed monitoring can also be used for determining the inertia moment, and the circuit configuration for determining the inertia moment can be simplified.

Although the disclosure has been described above with the embodiment as an example, those skilled in the art should understand that it is possible to make various modifications to each component and each processing process of the embodiment within the scope of the claims. Modified examples are provided below.

Although the grinder 1 is illustrated as the electric tool in the embodiment, the electric tool may be other types of devices such as a circular saw. The electric tool is not necessarily provided with a cord, and may be a cordless type that operates with the power of a detachably mounted battery pack.

What is claimed is:
1. An electric tool, comprising:
a motor;
an inverter circuit supplying an electric current to the motor and having a plurality of switching elements; and
a controller controlling the inverter circuit;
a capacitor provided on an input side of the inverter circuit,
wherein when generating an electric braking force on the motor, the controller performs a first braking control of turning on at least one of the plurality of switching elements of the inverter circuit and then performs a second braking control of repeatedly turning on and off the at least one of the plurality of switching elements, wherein the controller performs the second braking control so that a voltage applied to the capacitor by a regenerated energy does not exceed a withstand voltage of the capacitor.

2. The electric tool according to claim 1, wherein the controller switches from the first braking control to the second braking control when a rotation speed of the motor becomes equal to or less than a predetermined rotation speed in a braking control.

3. The electric tool according to claim 2, comprising:
a rotation tool driven by the motor,
wherein the controller sets the predetermined rotation speed according to an inertia moment of the rotation tool.

4. The electric tool according to claim 3, wherein the controller determines the inertia moment of the rotation tool based on a time change rate of a rotation speed during acceleration or deceleration of the motor or a starting current of the motor.

5. The electric tool according to claim 1, wherein the controller turns on at least one of upper arm-side switching elements of the plurality of switching elements or at least one of lower arm-side switching elements of the plurality of switching elements of the inverter circuit in the first braking control.

6. The electric tool according to claim 1, wherein the controller sets a duty ratio of an on period of the at least one of the plurality of switching elements constant in the second braking control.

7. The electric tool according to claim 1, wherein the controller sets a duty ratio of an on period of at least one of the plurality of switching elements variable in the second braking control.

8. The electric tool according to claim 7, wherein the controller gradually increases the duty ratio in the second braking control.

9. The electric tool according to claim 1, comprising:
an operation switch switching between driving and stopping the motor,
wherein the controller generates the electric braking force on the motor when the operation switch enters a state of instructing the motor to stop.

10. The electric tool according to claim 1, wherein the electric tool operates with an AC power supplied from outside.

11. An electric tool, comprising:
a motor;
an inverter circuit supplying an electric current to the motor; and
a controller controlling the inverter circuit;
a capacitor provided on an input side of the inverter circuit,
wherein when generating an electric braking force on the motor, the controller performs a first braking control in which a pulse width modulation control is not performed to the inverter circuit, and when a rotation speed of the motor becomes equal to or less than a predetermined rotation speed, the controller performs a second braking control in which the pulse width modulation control is performed,
wherein the controller performs the second braking control so that a voltage applied to the capacitor by a regenerated energy does not exceed a withstand voltage of the capacitor.

12. The electric tool according to claim 11, comprising:
a rotation tool driven by the motor,
wherein the controller sets the predetermined rotation speed according to an inertia moment of the rotation tool.

* * * * *